United States Patent [19]

Hieda

[11] Patent Number: 5,471,241
[45] Date of Patent: Nov. 28, 1995

[54] IMAGE SENSING METHOD AND APPARATUS FOR PRODUCING A COLOR VIDEO SIGNAL AND LUMINANCE VIDEO SIGNAL

[75] Inventor: Teruo Hieda, Yokohama, Japan

[73] Assignee: Canon Kabushiki Kaisha, Tokyo, Japan

[21] Appl. No.: 205,664

[22] Filed: Mar. 2, 1994

[30] Foreign Application Priority Data

Mar. 5, 1993 [JP] Japan .................................. 5-044951

[51] Int. Cl.⁶ .................................................. H04N 9/64
[52] U.S. Cl. .......................... 348/222; 348/34; 348/256
[58] Field of Search ..................................... 348/222, 223, 348/217, 229, 256, 645, 659, 660, 34; H04N 9/73, 5/235, 9/64

[56] References Cited

U.S. PATENT DOCUMENTS 5,255,093 10/1993 Topper et al. ........................ 348/256
5,282,022 1/1994 Haruki et al. ......................... 348/223
5,293,225 3/1994 Nishiyama et al. ................... 348/256

FOREIGN PATENT DOCUMENTS 0420612 4/1991 European Pat. Off. ......... H04N 9/64
4126488 4/1992 Japan ............................... H04N 9/64

Primary Examiner—James J. Groody
Assistant Examiner—Jeffrey S. Murrell
Attorney, Agent, or Firm—Morgan & Finnegan

[57] ABSTRACT

An image sensing apparatus having a small amount of circuitry and exhibiting little power consumption is characterized in that a required delay line is connected into the circuitry at a point after a gamma-corrector in a digital signal processing system that processes an intensity signal, and another required delay line is connected into the circuitry at a point after a limiter in a corrective-signal generating system, which is for generating a signal that corrects a color signal. As a result, the delay lines are provided in fewer stages and need only have a small bit width. This makes it possible to reduce the amount of circuitry as well as power consumption.

8 Claims, 3 Drawing Sheets

IMAGE SENSING METHOD AND APPARATUS FOR PRODUCING A COLOR VIDEO SIGNAL AND LUMINANCE VIDEO SIGNAL

BACKGROUND OF THE INVENTION

1. Field of the Invention

This invention relates to an image sensing method and an apparatus therefor. More particularly, the invention relates to an image sensing method and apparatus in which digital signal processing is executed.

2. Description of the Related Art

A color image sensing method available in the prior art performs color image sensing using a single solid-state image sensing element composed of very small color filters arrayed on an image sensing surface. According to this method, carrier components of a color signal are removed from the output of the image sensing element to form an intensity signal, a color signal is formed by synchronously detecting the carrier components, and the color and intensity signals are processed separately to synthesize a color image signal.

Many image recording/playback apparatus have been proposed for recording the image signal on video tape and playing back the image signal. 25 In particular, many systems, in which a high-speed analog/digital converter (hereinafter referred to as an "AD converter") and a digital/analog converter (hereinafter referred to as a "DA converter") is used, have recently been proposed. These systems are arranged to convert the image signal into a digital signal using the AD converter, execute digital signal processing such as filtering, gamma-correction, a matrix operation and clipping necessary in the image sensing apparatus, effect a digital-to-analog conversion, store the results on tape and playback and output the image when necessary.

Further, systems have been proposed in which special effects such as freezing of the picture and intermittent image sensing are obtained using a field memory.

However, in these prior-art image sensing apparatus using digital signal processing, the circuitry is large in which use is made of a high-speed analog/digital converter (hereinafter referred to as an "AD converter") and a digital/analog converter (hereinafter referred to as a "DA converter") scale, the number of component parts is large, a large amount of current is consumed, the apparatus cannot be reduced in size and cost cannot be reduced.

SUMMARY OF THE INVENTION

Accordingly, an object of the present invention is to provide an image sensing method, in which the circuitry and current consumption are minimal, for producing a video signal from a coded image signal.

Another object of the invention is to provide an image sensing apparatus, in which the circuitry and current consumption are minimal, for producing a video signal from a coded image signal.

According to the present invention, the foregoing objects are attained by providing an image sensing apparatus for producing a video signal by subjecting an output video signal from a color image sensing element to digital signal processing, comprising analog-digital converting means for converting the output video signal of the color image sensing element into a digital video signal, color-difference signal extracting means for extracting color-difference signals from the digital video signal, gain control means for producing gain-controlled color-difference signals by controlling the gain of the color-difference signals, filtering means for cutting prescribed high-frequency components of the gain-controlled color-difference signals, and video-signal producing means for producing a color video signal based upon the color-difference signals, from which the high-frequency components have been cut, outputted by the filtering means.

Further, the foregoing objects are attained by providing an image sensing method for producing a video signal by subjecting an output video signal from a color image sensing element to digital signal processing, comprising an analog-digital converting step of converting the output video signal of the color image sensing element into a digital video signal, a color-difference signal extracting step of extracting color-difference signals from the digital video signal, a gain control step of producing gain-controlled color-difference signals by controlling the gain of the color-difference signals, a filtering step of cutting prescribed high-frequency components of the gain-controlled color-difference signals, and a video-signal producing step of producing a color video signal based upon the color-difference signals, from which the high-frequency components have been cut, outputted at the filtering step.

Further, the foregoing objects are attained by providing an image sensing apparatus for producing a video signal by subjecting an output video signal from a color image sensing element to digital signal processing, comprising image sensing means for producing an electric signal by converting an object's image into the electric signal, digital-signal processing means for subjecting said video signal to digital processing, which means includes non-linear converting means for converting the electric signal into a non-linear signal, and digital-delaying means for delaying an output of said non-linear converting means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 1:
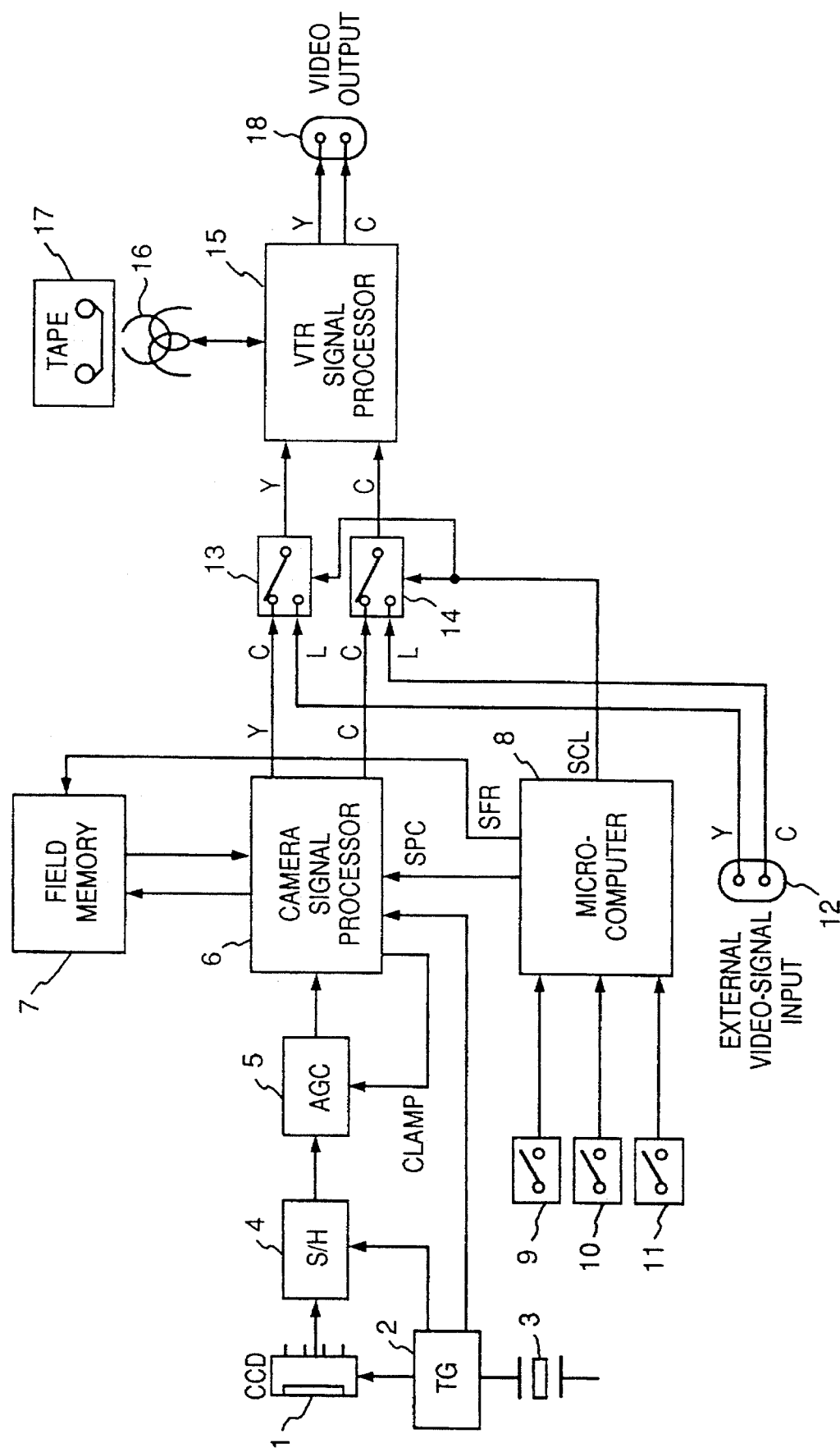
FIG. 1 is a block diagram illustrating a sensed-image recording/playback apparatus according to an embodiment of the present invention.

FIG. 1 is a block diagram illustrating the construction of a sensed-image recording/playback apparatus according to an embodiment of the invention. As shown in FIG. 1, the apparatus includes a CCD 1 serving as a color image sensing element. A timing generating circuit 2 generates a drive signal for the CCD 1, a timing signal for sampling processing and holding processing in a sample-and-hold circuit 4, and a signal processing clock for a camera signal processor 6. A crystal oscillator 3 supplies the timing generating circuit 2 with a reference clock. In synchronism with the timing signal from the timing generating circuit 2, the sample-and-hold circuit 4 samples the output signal of the CCD 1 and holds the sampled signal. An AGC 5 automatically adjusts the amplification gain of the image signal outputted by the sample-and-hold circuit 4. The image signal outputted by the AGC 5 enters the camera signal processor 6, which executes processing such as filtering, color separation, gamma correction, gain adjustment and clipping to produce video signals. A field memory 7 stores the image signal from the camera signal processor 6 and is used in such special effects as freeze and strobe photography. A control circuit 8 reads the various states of switches 9, 10, 11 and controls the camera signal processor 6, the field memory 7 and switch circuits 13, 14, etc. The control circuit 8 can be realized by a microprocessor having an internal control program. The switches 9, 10, 11 are used by the operator to set the operating mode of the sensed-image recording/playback apparatus. Numeral 12 denotes an external video-signal input terminal for entering external video signals. In response to a changeover signal SCL outputted by the control circuit 8, the switch circuits 13, 14 select the video signals outputted by the camera signal processor 6 or the external video signals that enter from the external video-signal input terminal 12. A VTR signal processor 15 executes processing for recording and playing back video signals for a VTR. Numeral 16 denotes a head for magnetic recording and playback, 17 a video tape serving as a medium for recording the video signal, and 18 a video-signal output terminal for outputting the video signal to an externally connected device such as a display monitor.

In the apparatus illustrated in FIG. 1, the control circuit 8, in accordance with the setting of the switch 11, generates the camera-signal/external-signal changeover signal SCL to change over the switch circuits 13, 14, thereby selecting either of two operating modes, namely a mode for recording the camera output signal or a mode for recording the external input. Operation in each of these modes will now be described.

The camera recording mode will be described first. In this case, the switch circuits 13, 14 are connected to a side C, which is the camera side.

The image of the subject formed through the very small color filters on the image sensing surface of the CCD 1 is photoelectrically converted into an electric signal. Then, in synchronism with a drive signal produced by frequency-dividing the reference clock of the crystal oscillator 3 in the timing generating circuit 2, the electric signal resulting from the photoelectric conversion is read out successively, passed through the sample-and-hold circuit 4 and amplified to a prescribed signal level in the AGC 5. The AGC 5 also operates to make the DC level of the input signal constant based upon a clamping signal CLAMP generated by the camera signal processor 6. The output of the AGC 5 enters the camera signal processor 6. In conformity with the clock generated by the timing generating circuit 2, the camera signal processor 6 executes processing such as filtering, color separation, gamma correction, gain adjustment and clipping to produce the intensity signal Y and color signal C. The camera signal processor 6 outputs a signal, which is currently being processed, to the field memory 7 as a digital video signal. The field memory 7 writes the input digital video signal in synchronism with a field-memory control signal SFR outputted by the control circuit 8.

The digital video signal that has been written is repeatedly read out of the field memory 7 and outputted to, say, a display monitor connected to the video output terminal, whereby the corresponding image is capable of being displayed in a frozen state. The digital video signal can be written in the field memory intermittently and then read out and delivered to, say, the display monitor, whereby the corresponding image can be displayed in a strobe-like manner.

The camera signal processor 6 detects DC components of the input signal from the AGC 5, generates the CLAMP signal for holding the DC components at a prescribed value and delivers the CLAMP signal to the AGC 5.

Next, the output signals Y and C from the camera signal processor 6 enter the VTR signal processor 15 via the switch circuits 13, 14, respectively. The processor 15 executes signal processing necessary for recording on a VTR and records the resulting signals on the video tape 17 via the head 16. At playback, the digital video signals recorded on the video tape 17 are read by the head 16, the VTR signal processor 15 executes signal processing necessary for image playback, and the playback signals are outputted to the output terminal 18. An external device such as a display monitor is connected to the output terminal 18.

The external-input recording mode will now be described. In this case, the switches 13, 14 are connected to the external input (L) side. The external video input signals enter from the external input terminal 12, pass through the switches 13, 14 and enter the VTR signal processor 15, where the signals are recorded on the video tape 17 just as in the camera recording mode.

In conformity with the states of the switches 9, 10, 11 connected, the control circuit 8 delivers various control signals to the camera processor 6 and the switches 13, 14, etc. For example, in dependence upon the set state of the switch 9, the control circuit 8 generates and outputs a control signal SPC for controlling the camera signal processor 6, thereby changing over a switch circuit (not shown) within the processor. In dependence upon the set state of the switch 10, the control circuit 8 generates and outputs the field-memory control signal SFR. In dependence upon the set state of the switch 11, the control circuit 8 generates and outputs the camera-signal/external-signal changeover signal SCL to change over the switch circuits 13, 14. Furthermore, the control circuit 8 senses the introduction of power from a power supply and generates the control signal SPC to initialize a memory (not shown) within the camera signal processor 6.

Figure 2:
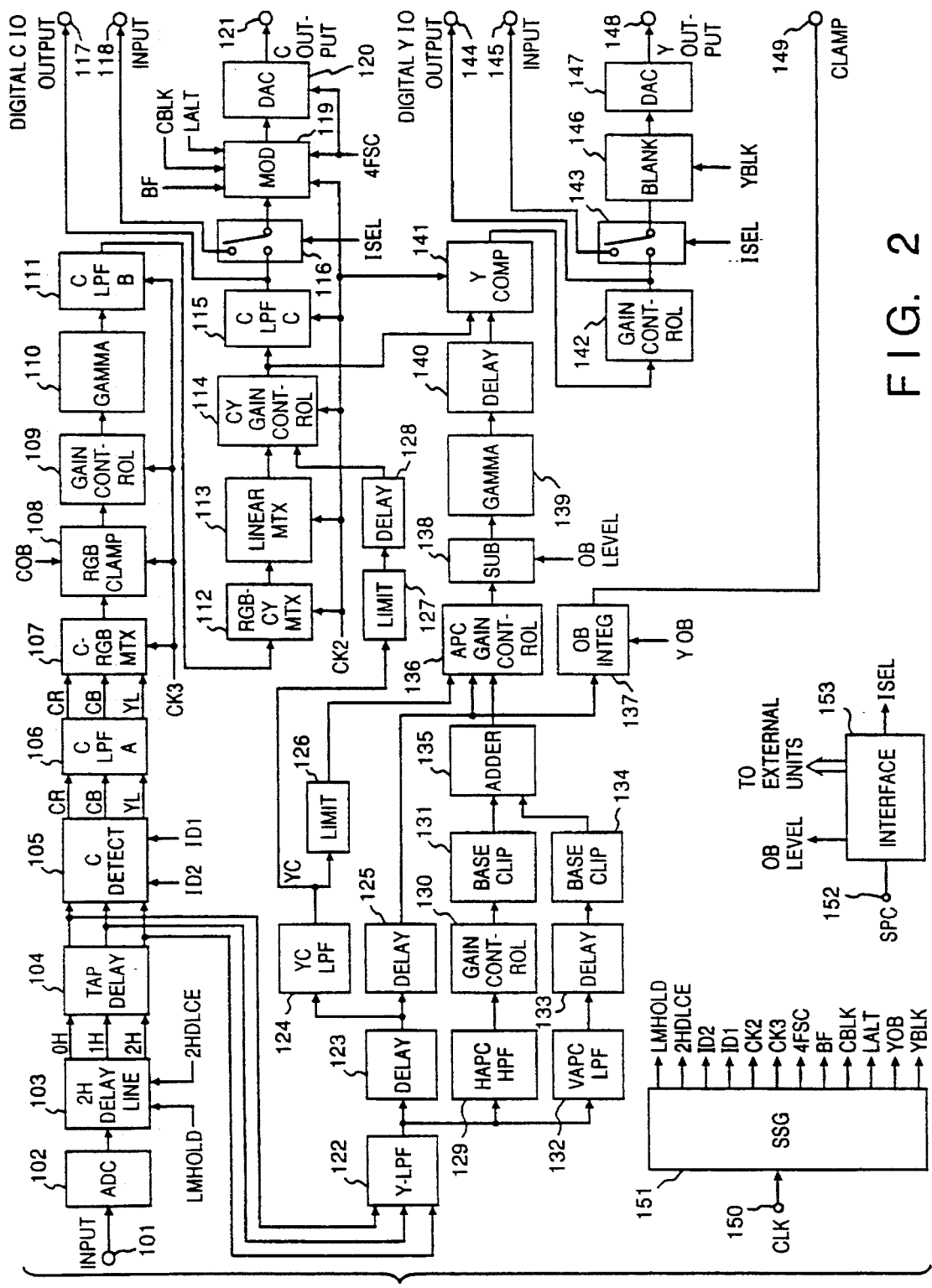
FIG. 2 is a detailed block diagram illustrating a camera signal processor in the apparatus of FIG. 1.

FIG. 2 is a diagram illustrating the detailed construction of the camera signal processor 6 shown in FIG. 1. Numeral 101 denotes a terminal for entering the signal representing the sensed image. The terminal 101 is connected to an AD converter 102, whose output is applied to a 2H delay line 103 having two delay lines each for applying a delay equivalent to one horizontal interval (H). The delay line 103 outputs signals delayed by 0H, 1H and 2H. A tap delay circuit 104, which includes a prescribed number of cascade-connected delay elements, provides a plurality of delayed outputs corresponding to the three input signals delayed by 0H, 1H and 2H.

A color detecting circuit (C DETECT) 105 synchronously detects the input signals and obtains a red color-difference signal CR, a blue color-difference signal CB and a low-pass intensity signal YL. A color low-pass filter (C LPF A) 106 subjects each of the input signals to low-pass filtering. A color-RGB matrix circuit (C-RGB MTX) 107 synthesizes a red signal (R), a green signal (G) and a blue signal (B) from the input signals CR, CB, YL by a matrix operation and subjects the resulting signals to time-shared multiplexing in conformity with a clock signal CK3, which is the result of frequency division by three. An RGB clamping circuit (RGB CLAMP) 108 applies an automatic DC-level correction in such a manner that the signal level of an optically black portion of each of the input time-shared R, G, B signals will attain a prescribed value. A gain control circuit (GAIN CONTROL) 109 is for variably controlling the amplitude of each of the input time-shared R, G, B signals, and a gamma correcting circuit (GAMMA) 110 applies a gamma correction. A color low-pass filter (C LPF B) 111 separates the input time-shared R, G, B signals into three portions and executes 0-insertion processing, after which low-pass filtering is applied. An RGB—color-difference matrix (RGB-CY MTX) 112 subjects the input R, G, B signals to a matrix operation to synthesize color difference signals R-Y and B-Y and, in conformity with a clock CK2 resulting from frequency-division by two, subjects these color-difference signals to time-shared multiplexing. A linear matrix circuit (LINEAR MTX) 113 applies a matrix operation to the input time-shared color-difference signals, thereby performing a hue correction. A color-difference signal gain control circuit (CY GAIN CONTROL) 114 varies the amplitudes of the color-difference signals in conformity with a control signal input. A color low-pass filter (C LPF C) 115 subjects the input time-shared color-difference signals to low-pass filtering.

Numerals 116, 143 denote switch circuits, 117, 144 output terminals for digital color and intensity signals, respectively, and 118, 145 input terminals for digital color and intensity signal inputs, respectively.

By using a clock 4FSC having a frequency four times that of the color subcarrier, a modulator (MOD) 119 orthogonally modulates the input time-shared color-difference signals. Numerals 120, 147 denote DA converters (DAC), and numeral 121 represents a color-signal output terminal.

A Y low-pass filter (Y LPF) 122 delivers output signals from which the color carrier of the input signal has been removed, as well as a vertical-contour signal obtained by subtracting these output signals from one another and passing the high frequencies of the vertical direction.

Numerals 123, 125, 128, 133, 140 denote delay lines each having a prescribed delay time.

Numeral 124 designates a low-pass filter (YC LPF) that forms a intensity signal YC for correction purposes, 126 a limiter (LIMIT) for limiting signal level in excess of a prescribed input, and 127 a limiter (LIMIT) for limiting an input signal level that is greater than a first prescribed value and reducing a signal level that is greater than a second prescribed value, which is larger than the first prescribed value. A high-pass filter (HAPC HPF) 129 is for extracting a horizontal-contour signal, a gain control circuit (GAIN CONTROL) 130 varies the amplitude of the input signal thereto, and base clipping circuits (BASE CLIP) 131, 134 suppress input signals in the vicinity of 0. Numeral 132 denotes a low-pass filter (VAPC LPF) for subjecting the vertical-contour signal to low-pass filtering, and numeral 135 represents an adder (ADDER).

A gain control circuit (APC GAIN CONTROL) 136 controls the amplitude of a contour enhance signal and adds the intensity signal to the resulting signal, and an optical-black integrating circuit (OB INTEG) 137 integrates the optical black portion contained in an input signal, controls the DC component and produces a clamping signal (CLAMP). Numeral 138 denotes a subtractor, 139 a gamma correcting circuit (GAMMA), 141 an intensity compensating circuit (Y COMP) for correcting the intensity signal in conformity with the color-difference signal, 142 a gain control circuit for controlling signal amplitude, 146 a blanking circuit (BLANK) for executing blanking processing based upon a composite blanking signal CBLK, 148 an intensity-signal output terminal, and 149 a clamping-signal output terminal.

Numeral 150 designates a clock input terminal and 151 a synchronous signal generator (SSG) for generating various timing signals by frequency-dividing the input clock signal CLK. Numeral 152 denotes an input terminal for entering the signal-processing control signal SPC, and 153 an interface, to which the control signal SPC from the control circuit 8 is applied, for generating an OB LEVEL signal as well as control signals for the various processing units.

The operation of the camera signal processor 6 will now be described.

Figure 3:
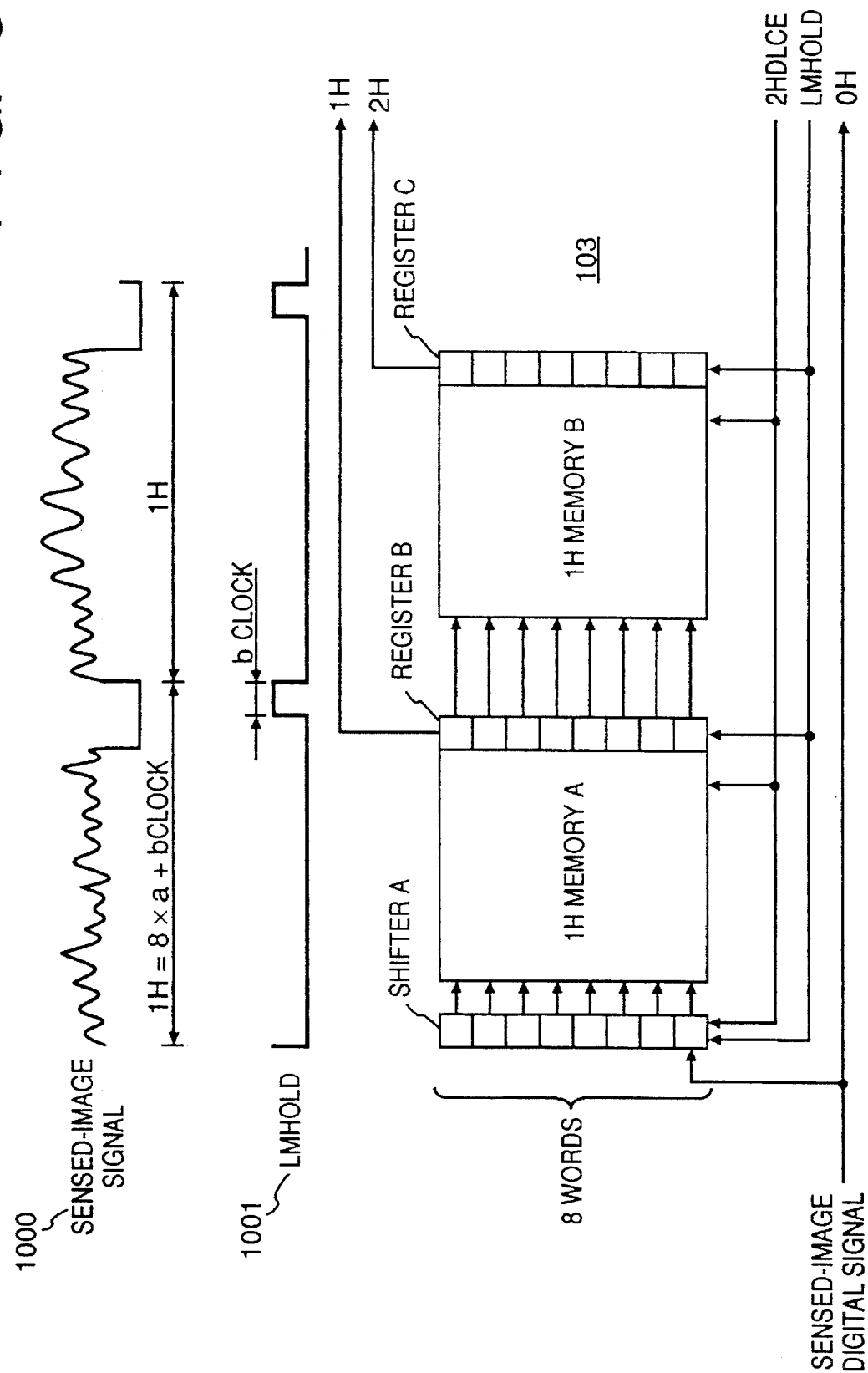
FIG. 3 is a diagram illustrating an example of the construction of a 2H delay line in FIG. 2.

The sensed-image signal that has entered from the input terminal 101 is converted from an analog to a digital signal by the AD converter 102 and the resulting analog signal enters the 2H delay line 103. FIG. 3 illustrates an example of the construction of the 2H delay line 103. As shown in FIG. 3, the 2H delay line 103 comprises two identically constructed 1H memories, namely a 1H memory A and a 1H memory B, a shifter A, register B and register C. By virtue of this construction, the signals delayed by 0H, 1H and 2H are produced from the digital image signal that has entered from the AD converter 102. In order to simplify the following description, it will be assumed that the 1H interval is represented by "8×a+b clocks".

The shifter A subjects the digital image signal to data shifting equivalent to eight words. Specifically, while the successively entering digital image signals are inputted in word units, the shifter A shifts the word data in units of the clock.

When the data has been fully stored in the shifter A, i.e., after a period of eight clocks, all of the data in the shifter A is transferred to the 1H memory A in parallel. Thereafter, and in the manner just described, the shifter A shifts word data in clock units while the digital image signal enters in word units. When the next eighth clock arrives, all of the data in the shifter A is parallel-shifted to the 1H memory A. This operation is performed in repeated fashion. The 1H memory A is constructed as a FIFO to which data successively transferred in eight-word units is inputted. When data is fully written in the 1H memory A, i.e., when "8×a" clocks of data is written in the 1H memory A, the data is parallel-transfered to the 1H memory B in order starting from the oldest inputted eight-word data. A LMHOLD signal is a signal that becomes active at the timing at which the "8×a" clocks of data is written. That is, the transfer of data from the 1H memory A to the 1H memory B is suspended for a "b" clocks' interval, namely until the next 1H cycle begins. Further, a 2HDLCE signal outputted by the synchronizing signal generator SSG 151 becomes active in the horizontal and vertical blanking intervals and halts the operation for outputting the 1H and 2H signals from a register B and a register C. As a result, power consumption can be reduced.

Thus, as described above, the construction of the 2H delay line 103 is such that the input digital image signal is subjected to a serial-parallel conversion and the resulting parallel data is written in the internal 1H memories simultaneously. As a result, the operating speeds of the 1H memories can be slowed down to reduce power consumption.

Numeral 1000 denotes the form of the image signal representing the sensed image, and numeral 1001 indicates the timing of the signal LMHOLD.

The three outputs of the 2H delay line 103 are each delayed by a prescribed number of delay elements in the tap delay circuit 104. The outputs of the tap delay circuit 104 are three in number in FIG. 2 in order to simplify the description. In actuality, however, if there are six delay elements for each input, there will be outputs for the input signal and each output of the six delay elements, i.e. for a total of seven output signals, all of which will be delivered to a group of intensity processing circuits, which is illustrated as arranged around the center portion of FIG. 2, the three signals necessary for color separation will be delivered to a group of color-signal processing circuits, which is illustrated as arranged around the upper portion of FIG. 2. Thus, since the delay elements are used in a shared manner, the amount of circuitry can be reduced.

The outputs of the tap delay circuit 104 enter the color detecting circuit 105. The latter outputs the signals CR, CB, YL, which include color components, by performing synchronous detecting of the input signals in conformity with a horizontal color identification signal ID1 and a vertical color identification signal ID2, which are generated and outputted by the SSG 151 and correspond to the color filters of the CCD 1. Color signals of a color-signal band are extracted from the CR, CB, YL signals by the color low-pass filter 106. The color-RGB matrix circuit 107 subjects the extracted color signals to a matrix operation to generate the R, G, B signals, performs time-shared multiplexing and outputs the multiplexed signals to the RGB clamping circuit 108. The RGB clamping circuit 108 applies an automatic DC-level correction in such a manner that the signal level of an optically black portion of each of the input time-shared R, G, B signals will attain a prescribed value. The corrected signal has its amplitude adjusted by the gain control circuit 109. The gain at this time is set based upon the color temperature of the photographic subject, which is detected by a white-balance detecting circuit, for example, or by integrating, color by color, the digital color-signal output of the camera signal processor 6, detecting the offset of the color-difference signal from zero, and setting the gain in such a manner that the offset becomes zero.

The output of the gain control circuit 109 is gamma-corrected by the gamma correcting circuit 110. The gamma-corrected RGB color signal is separated into the three RGB components by the color low-pass filter 111, executed 0-insertion processing on each of the resulting components and then low-pass filtered to produce the R, G, B signals. The RGB—color-difference matrix circuit 112 generates time-shared, multiplexed color difference signals R-Y and B-Y from the input R, G, B signals. The linear matrix circuit 113 applies hue-correcting processing to the time-shared, multiplexed color difference signals R-Y and B-Y. In accordance with a control signal, described below, the color-difference signal gain control circuit 114 controls the amplitudes of the hue-corrected color difference signals R-Y and B-Y. Since the control signal is generated in such a manner that gain is lowered in low-intensity portions and high-intensity portions, color noise in the low-intensity portions and false colors produced in the high-intensity portions can be suppressed.

The color-difference signals R-Y and B-Y outputted by the color-difference signal gain control circuit 114 are subjected to low-pass filtering processing by the color low-pass filter 115 to pass a low-frequency signal and is output from the output terminal 117 to one input terminal of the switch circuit 116 as a digital color signal.

One important point of this embodiment is that the color low-pass filter 115 is inserted in the circuitry after the color-difference signal gain circuit 114. More specifically, since the filter is inserted at a location at which the data width is small, the scale of circuitry of the color low-pass filter can be reduced. Further, if a FIR filter arrangement, for example, is used to construct the color low-pass filter 115, synchronization can be established between the final digital intensity-signal output and digital color-signal output by delaying the digital color signal within the range of the number of delay taps. As a result, additional delay circuitry need not be provided.

In accordance with an input changeover signal ISEL generated by the interface circuit 153, described below, the switch circuit 116 selects the external digital signal that has entered from the external digital-signal input terminal 118 or the output of the color low-pass filter 115. The selected output as a color-difference signal is applied to the modulator 119. Using 4FSC, which is a clock signal from the SSG 151 having a frequency four times that of the color subcarrier, the modulator 119 orthogonally transforms the color-difference signal, executes blanking processing in conformity with CBLK and adds on a color-burst signal based upon BF (a burst flag). In the case of a PAL system, the modulator 119 inverts the phase of the output signal in dependence upon LALT and forms a chrominance signal. The chrominance signal is converted into an analog signal by the DA converter 120, and the analog signal is delivered from the output terminal 121 to the switch circuit 13 (see FIG. 1), described above.

The foregoing is a description of the processing procedure in the color signal processing system. The processing procedure in the intensity-signal processing system will be described next.

The 0H, 1H and 2H delay outputs of the tap delay circuit 104 enter the Y low-pass filter 122. The latter eliminates the color-signal carrier component from each of the 0H, 1H and 2H delay signals and produces an intensity signal corresponding to each delay signal. Furthermore, the Y low-pass filter 122 subtracts the generated intensity signals from one another and produces a vertical-contour signal obtained by passing the vertically directed high-frequency components. The intensity signals from which the carrier component has been eliminated are delayed a prescribed length of time by the delay line 123, then low-frequency components are extracted by the low-pass filter 124, whereby the corrective intensity signal YC is produced. The signal YC is limited by the limiter circuit 127, the limited signal is delayed a prescribed length of time by the delay line 128 and the delayed signal enters the color-difference gain control circuit 114 as a control signal. The color-difference gain control circuit 114 suppresses color signals of low-intensity and high-intensity portions, as set forth above. It should be noted that since the output of the limiter circuit 127 has a data width smaller than that of the input thereof, inserting the delay line 128 after the limiter circuit 127 makes it possible to reduce the scale of the circuitry of the delay line 128.

The output of the low-pass filter 124 also enters the limiter 126, where amplitude greater than a prescribed value is limited. The limited signal is applied to the contour-signal gain control circuit 136, described later, as a control signal.

The output of the delay line 123 is delayed for a prescribed length of time by the delay line 125. Since use of the delay line 123 is shared to form the corrective intensity signal YC and the intensity signal, the scale of the circuitry can be reduced. The output of the delay line 125 enters the contour-signal gain control circuit 136 and the optical-black integrating circuit 137 as the intensity signal. On the basis of an intensity optical-black signal YOB generated by the SSG 151, the optical-black integrating circuit 137 integrates the component corresponding to optical black of CCD 1 and delivers the clamping signal CLAMP to the AGC 5 (see FIG. 1) via the output terminal 149. By taking the input signal to the optical-black integrating circuit 137 from a stage located ahead of the gamma corrector 139, correction is possible, inclusive of correction of DC error in contour enhancing processing by the Y low-pass filter 122. This makes it possible to set the black level correctly.

The output of the Y low-pass filter 122 is delivered also to the high-pass filter 129, which extracts the horizontal-contour signal, namely the high-frequency components. The amplitude of the extracted horizontal-contour signal is adjusted by the gain control circuit 130, which delivers the resulting signal to the base clipping circuit 131. This circuit executes base clipping processing to suppress input signals in the vicinity of 0 and outputs the resulting signal to the adder 135. The latter adds the horizontal-contour signal, which has been base-clipped by the base clipping circuit 131, and the base-clipped vertical-contour signal, described below. As for the setting of the amounts of emphasis of horizontal and vertical edges, the optimum amounts of edge emphasis are set by adjusting the gain control circuit 130 beforehand in such a manner that the amount of emphasis of both edges will coincide.

The vertical-contour signal contained in the output of the Y low-pass filter 122 has its low-frequency components extracted by the low-pass filter 132, the resulting signal is delayed a prescribed length of time by the delay line 133 and base clipping is carried out by the base clipping circuit 134, after which the result is added as the vertical-contour signal to the output signal of the base clipping circuit 131 by means of the adder 135.

The output of adder 135 enters the contour-signal gain control circuit 136 as the contour signal. In conformity with the control signal outputted by the limiter circuit 126, the gain control circuit 136 adjusts the amplitude of the contour signal from the adder 135, after which the resulting signal is added to the intensity signal from the delay line 125. It should be noted that by adjusting gain based upon the control signal from the limiter 126, i.e., by making gain small in an area where the YC level is low, noise in the dark portion can be made less conspicuous. Alternatively, by making gain small in an area where the YC level is high, it is possible to prevent an over-correction in which the contour signal becomes too large in the high-intensity portion.

The output of the contour-signal gain control circuit 136 is applied to the subtractor 138, which subtracts the optical black-level signal OB LEVEL generated by the interface 153 from this applied signal. The output of the subtractor 138 is gamma-corrected by the gamma correcting circuit 139. Since the input signal of the gamma correcting circuit 139 is the result of subtracting the optical black level, an accurate gamma correction can be carried out. Further, since the gamma correction is performed upon eliminating negative signals less than the black level, the scale of the gamma correcting circuitry can be reduced.

The output of the gamma correcting circuit 139 is delayed a prescribed period of time by the delay line 140. The prescribed delay time is set by the intensity compensating circuit 141 in such a manner that the intensity signal outputted by the delay line 140 and the color-difference signal, which is used in compensation, outputted by the color-difference signal gain circuit 114 will agree in terms of time.

It will suffice for the gamma-corrected signal to have a resolution less than that of the signal prior to the gamma correction. Consequently, applying the delay after the gamma correction is performed makes it possible to reduce the scale of the circuitry of delay line 140. This output is corrected by the intensity compensating circuit 141 based upon the color-difference signal outputted by the color-difference gain control circuit 114 described above. Specifically, when the color-component ratio in the signal obtained from the CCD 1 deviates from the standard value of the NTSC, the above-described operation compensates for this. For example, if the transmission factor of the red component is larger or the color temperature of the photographic subject is low and there are many red components, the above-described output representing as intensity is corrected by diminishing this output in conformity of the red component of the color-difference signals, in such a manner that the color-signal ratio in the intensity signal will approach the normal value. At this time the color-difference signals are the time-shared signals of R-Y and B-Y, and therefore the respective values are separated by the timing signal CK2.

The output of the intensity compensating circuit 141 is controlled in gain by the gain control circuit 142. By gradually varying the gain with time by the interface 153, an image fading operation can also be performed without increasing circuitry. This output is delivered from the intensity-signal output terminal 144 and enters one input of the switch circuit 143.

In conformity with the input changeover signal ISEL generated by the interface circuit 153, described below, the external digital signal that enters from the external digital-signal input terminal 145 or the output signal of the gain controller 142 is selected by the switch circuit 143 in the same manner as described earlier regarding the switch circuit 116. The digital signal selected by the switch circuit 143 is blanked in synchronism with the YBLK signal by the blanking circuit 146. Since the external digital signal also is blanked, picture quality will not be adversely affected even if scratches or the like are produced in the blanking portion by external processing.

The digital signal that has been subjected to blanking processing is subjected to a digital-to-analog conversion by the DA converter 147 and then is outputted from the intensity-signal output terminal 148 as the intensity signal. The SSG 151 frequency-divides the input clock signal CLK to produce various timing pulses.

In conformity with the signal-processing control signal SPC that enters from the control circuit 8, the interface 153 produces the signals OB LEVEL and ISEL as well as timing signals necessary for the various processing units. Since the data used in the various processing units is set externally, fine adjustment of picture quality can be carried out and a picture-quality setting conforming to the imaged scene can be performed.

Thus, in accordance with the illustrated embodiment, it is possible to realize a compact, high-performance and low-cost sensed-image recording/playback apparatus having a small number of component parts. Further, since delay lines are inserted at locations where the number of stages and the bit width of the delay lines will become small, it is possible to realize a sensed-image recording/playback apparatus in which the circuitry is small in scale and little current is consumed.

Thus, in accordance with the present invention as described above, a required delay line is connected into the circuitry at a point after the gamma correcting circuit in the digital intensity signal processing system, and a required delay line is connected into the circuitry at a point after the limiter circuit in the corrective-signal generating system for color signals. As a result, the scale of the delay-line circuitry can be reduced as well as the current consumed.

Further, in another aspect of the invention, a requisite low-pass filter is provided at a point after the gain control circuit in the digital signal processing system of the color signals, thereby making it possible to reduce the scale of the circuitry for the low-pass filter as well as the amount of current consumed.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus for producing a color video signal by subjecting an output video signal from a color image sensing element to digital signal processing, comprising:

intensity-signal extracting means for extracting an intensity signal from a digital video signal, which is an analog to digital signal converted from the output video signal from the color image sensing element;

limiting means for limiting an amplitude of the intensity signal;

color-difference signal extracting means for extracting color-difference signals from the digital video signals:

synchronization means for synchronizing said intensity signal limited by said limiting means with said color-difference signals extracted by said color difference signal extracting means;

gain control means for controlling the color-difference signals based upon said synchronized intensity signal; and video signal producing means for producing a color video signal by cutting predetermined high-frequency components from said color-difference signals controlled by said gain control means into a color video signal.

2. The apparatus according to claim 1, wherein said synchronizing means comprises a delay circuit.

3. An image sensing apparatus for producing a luminance video signal by subjecting an output video signal from a color image sensing element to digital signal processing, comprising:

analog-to-digital converting means for converting the output video signal of the color image sensing element into a digital video signal;

intensity-signal extracting means for extracting an intensity signal from a digital video signal, which is a signal analog-to-digital converted from the output video signal from the color image sensing element;

color-difference signal extracting means for extracting color-difference signals from the digital video signal;

gain control means for controlling the gain of the color difference signals;

gamma-correcting means for gamma-correcting the intensity signal;

synchronization means for synchronizing said intensity signal gamma-corrected by said gamma-correcting means with said color-difference signals gain-controlled by said gain control means; and luminance video signal producing means for correcting said intensity signal synchronized by said synchronization means based upon said color-difference signals gain-controlled by said gain control means, and producing a luminance video signal based upon said corrected intensity signal and a blanking signal.

4. The apparatus according to claim 3, wherein said synchronizing circuit comprises a delay circuit.

5. An image sensing method for producing a color video signal by subjecting an output video signal from a color image sensing element to digital signal processing, comprising:

an intensity-signal extracting step of extracting an intensity signal from a digital video signal, which is analog-to-digital signal converted from the output video signal from the color image sensing element;

a limiting step of limiting an amplitude of the intensity signal;

a color-difference signal extracting step of extracting color-difference signals from the digital video signals;

a synchronization step of synchronizing said intensity signal limited by said limiting step with said color-difference signals extracted by said color-difference signal extracting step;

a gain control step of controlling the color-difference signals based upon said synchronized intensity signal:

a video-signal producing step of producing a color video signal by cutting predetermined high-frequency components from said color difference signals controlled by said gain control step, into a color video signal.

6. The method according to claim 5, wherein said synchronizing step comprises a delay step.

7. An image sensing method for producing a luminance video signal by subjecting an output video signal from a color image sensing element to digital signal processing, comprising:

an analog-to-digital converting step of converting the output video signal of the color image sensing element into a digital video signal;

an intensity-signal extracting step of extracting an intensity signal from digital video signal, which is a signal analog-to-digital convened from the output video signal from the color image sensing element;

a color-difference signal extracting step of extracting color-difference signals from the digital video signal;

a gain control step of controlling the gain of the color-difference signals;

a gamma-correcting step of gamma-correcting the intensity signal;

a synchronization step of synchronizing said intensity signal gamma-corrected by said gamma-correcting step with said color-difference signals gain-controlled by said gain control step; and a luminance video signal producing step of correcting said intensity signal synchronized by said synchronization step based upon said color-difference signals gain-controlled by said gain-control step, and producing a luminance video signal based upon said corrected intensity signal and a blanking signal.

8. The apparatus according to claim 7, wherein said synchronizing step comprises a delay step.

* * * * *